United States Patent [19]

Ueno

[11] Patent Number: 4,684,274
[45] Date of Patent: Aug. 4, 1987

[54] PRINT HEAD SHIFTING APPARATUS FOR ELECTRONIC TYPEWRITER OR THE LIKE

[75] Inventor: Hideo Ueno, Nagoya, Japan

[73] Assignee: Brother Kogyo Kabushiki Kaisha, Nagoya, Japan

[21] Appl. No.: 818,061

[22] Filed: Jan. 13, 1986

Related U.S. Application Data

[63] Continuation of Ser. No. 586,822, Mar. 6, 1984, abandoned.

[30] Foreign Application Priority Data

Mar. 18, 1983 [JP] Japan .................................. 58-46569

[51] Int. Cl.⁴ .......................... B41J 19/71; B41J 19/50
[52] U.S. Cl. ..................................... 400/320; 400/279
[58] Field of Search ................ 364/519, 520; 340/724; 400/279, 320

[56] References Cited

U.S. PATENT DOCUMENTS

| 4,180,335 | 12/1979 | Yamada | 400/320 |
| 4,279,523 | 7/1981 | Ringle | 400/279 |
| 4,381,512 | 4/1983 | Butler | 364/520 |

OTHER PUBLICATIONS

Booth, "Proportional Spacing . . . ", IBM Technical Disclosure Bulletin, vol. 26, No. 4, pp. 2056-2061, 9/83.

Primary Examiner—William Pieprz
Attorney, Agent, or Firm—Moonray Kojima

[57] ABSTRACT

The print data and the head shift data which instruct feeding of a print head input from a keyboard of a typewriter, are sequentially stored temporarily in a print buffer. Print processing or heat shifting is executed on the basis of the data sequentially read from the print buffer. In case the head shift data is stored continuously in the print buffer, the head shifting apparatus calculates finally the target position of the print head and shifts the print head to such position.

4 Claims, 3 Drawing Figures

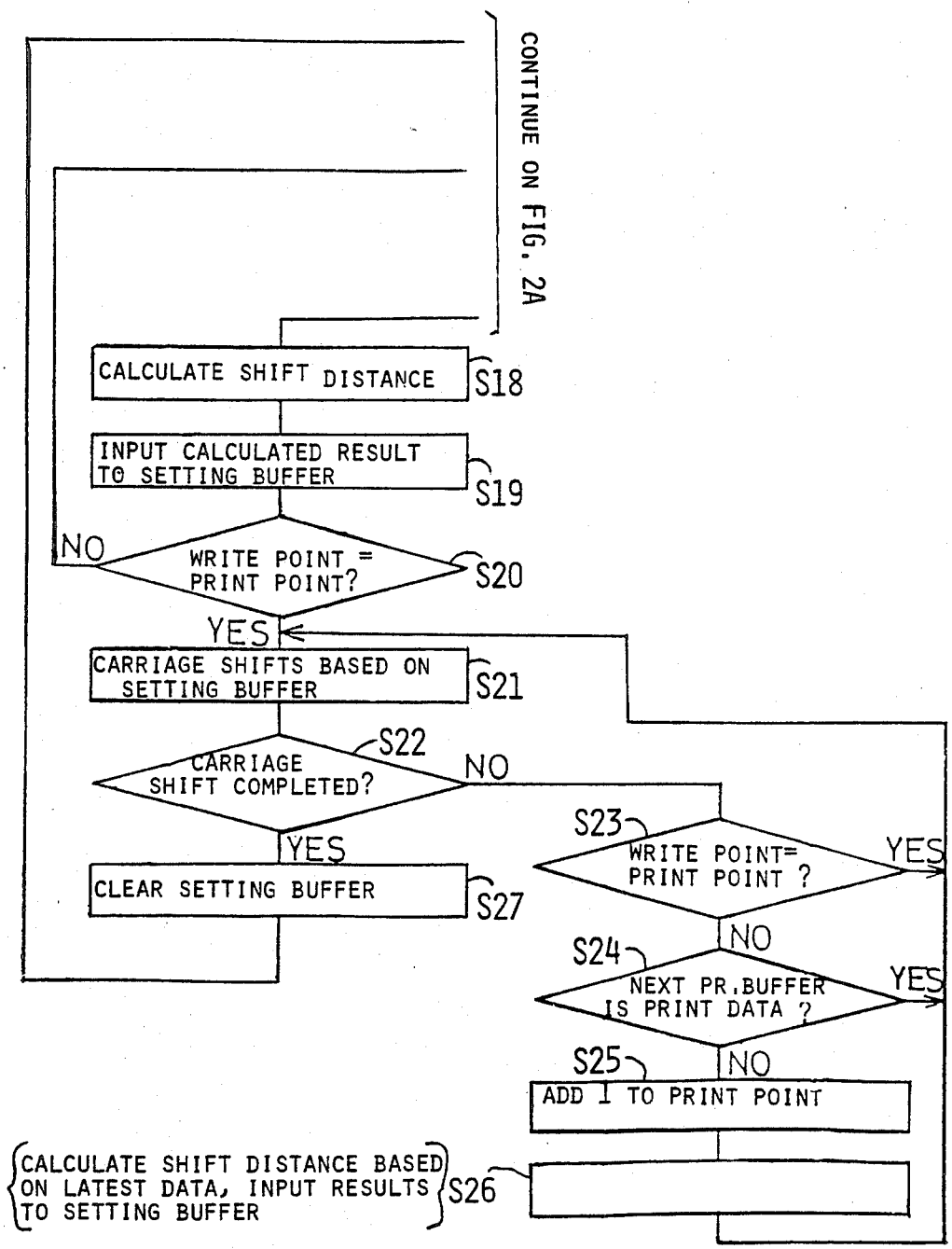

PRINT HEAD SHIFTING APPARATUS FOR ELECTRONIC TYPEWRITER OR THE LIKE

BACKGROUND OF THE INVENTION

1. Field of the Invention

This invention relates to an electronic typewriter which is capable of temporarily storing data from a keyboard in a print buffer and of printing the data on a printing paper in accordance with the contents of the print buffer, with shifting of a carriage having a print head thereon.

2. Description of the Prior Art

An electronic typewriter having a print buffer usually sequentially executes printing, shifting of carriage and paper feed, in accordance with data sequentially stored in a print buffer. Thus, for example, when a tab key, for shifting the carriage with print head up to a preset tab position is operated after operating a carriage return key, the carriage shifts first up to a left margin position in order to execute the carriage return operation and then shifts up to the preset tab position. The carriage shifting speed becomes zero when the carriage return operation has been completed and then becomes zero again when the carriage moves forward up to the preset tab position.

When the space key is depressed twice after the tab key is depressed, the carriage shifts at first up to the preset tab position in order to execute the tab operation and stops. Then, the carriage shifts for one space and stops again. Then, the carriage shifts again for one space.

As indicated in this example, the carriage goes backward and forward in the same area even when no printing operation is carried out or when the carriage stops between the tab position and the space data; or between the space data even when the head shift data for no printing operation is continuously inputted. For this reason, the carriage executes meaningless increase or decrease of shifting speed, or shifts in a meaningless range. Thus, the head shift data processing requires a longer time and power consumption is increased. Particularly, large power consumption becomes a problem when the typewriter or like is driven by a battery, since such large power consumption tends to decrease the operating life of the battery.

SUMMARY OF THE INVENTION

Accordingly, an object of the invention is to overcome the aforementioned and other deficiencies and disadvantages of the prior art.

Another object is to provide a print head shifting apparatus which prevents loss in processing time and reduces power consumption due to undesired shifts of the print head.

A further object is to provide a print head shifting apparatus which executes adequate heat shifting processing by sequentially reading the contents of a print buffer.

A still further object is to provide a print head shifting apparatus which sequentially calculates head shifting distances based on head shifting data continuously stored in a print buffer and executes the shifting of the print head, in case head shifting data which designates only a feed of print head without any printing operation is continuously stored in the print buffer and thereby shifts the print head by preventing undesired shifting of the print head.

BRIEF DESCRIPTION OF DRAWINGS

FIGS. 2A and 2B, taken together, are a flow chart showing a routine for the illustrative embodiment of FIG. 1.

DESCRIPTION OF THE PREFERRED EMBODIMENTS

Figure 1:
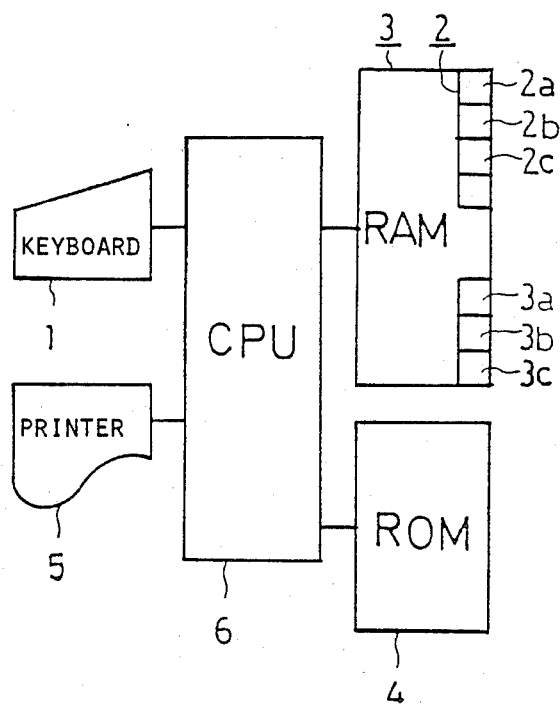
FIG. 1 is a block diagram depicting an illustrative embodiment of the invention.

Turning to FIG. 1, the apparatus comprises a keyboard 1 for inputting by keying, data comprising characters, symbols, print head feed, etc; a working RAM (random access memory) 3 for working as a print buffer 2, in which is temporarily written the data from the keyboard 1, a shift distance setting buffer 3a, a write point 3b to be added one by one in order to designate the print buffer 2 in which the data from keyboard 1 is inputted, and a print point 3c to be added one by one for each start of data processing of print buffer 2; an ROM (read only memory) 4 for storing one or more programs for sequentially calculating head shift distance based on head shift data in the data written into print buffer 2; and a printer 5 containing a head shifting apparatus which executes printing operation through feeding of printing paper mounted on a platen and shifting of the carriage having a print head thereon, and all of the foregoing components being connected to a CPU 6 (central processing unit which is used to control and execute the routines).

Operation of the embodiment will now be described with reference to the routine of FIGS. 2A and 2B, which are to be taken together as one flow chart. The routine will be more specifically described later by itself. When the power switch (not shown) of the apparatus is turned ON, CPU 6 reads an initialize routine which is stored in ROM4 and executes electronic or mechanical initialize steps, such as clearing of a shift distance setting buffer 3a, a print point 3c, etc, as shown for example in step S10. The keying operation on keyboard 1, by anoperator, is periodically scanned by a key scanning routine stored in ROM 4 and printing data comprised of characters, symbols, etc, to be printed or head shift data for such functions as carriage return, tab, space,without printing data being input from the keyboard, are written to a designated address of print buffer 2a in RAM 3 corresponding to a value of a write point 3b after 1 is added to the write point 3b in RAM 3.

In this embodiment, print buffer 2 is able to store sufficient data to be inputted for one line and the data keyed are sequentially written into print buffer 2 corresponding to a value of write point 3b to be added one by one.

Next, CPU 6 adds 1 to the print point 3c in step S12, and discriminates from the code, whether the data of print buffer 2a corresponding to such value, is the print data or the head shift data in step 13. When it is the print data, printing is executed in step S17 after shifting the carriage in accordance with the content of shift distance setting buffer 3a in steps S14–S16.

Meanwhile, when it is the head shift data, shift direction and distance of the carriage indicated by the data, are calculated in step S18 and the calculated result is written in the setting buffer 3a in step S19.

When the value of the write point 3b, in step S20, becomes equal to the value of the print point 3c, the carriage is shifted in accordance with the data of shift distance setting buffer 3a in step S21.

On the other hand, when there is a difference between the values of write point 3b and print point 3c in step S20, the print point 3c is added 1 in step S12 and then the contents of print buffer 2b indicated by print point 3c discriminates whether the data is the print data or the head shift data as described before in step S13.

When the data is the print data, the carriage with the print head thereon, shifts in accordance with the head shift direction and the head shift distance data is written in the shift distance setting buffer 3a in steps S14–S17. Thereafter, a character or a symbol designated by print data is printed.

On the other hand, when the data of print buffer 2b is the head shift data, the head shift direction and distance data designated by such data is added to the data of the shift distance setting buffer 3a in step S18 and the shift distance setting buffer 3a is renewed by such result in step S19.

When the new head shift data is continuously inputted during shifting of the carriage, the head shift distance is calculated again and the carriage is shifted on the basis of the result calculated as indicated in steps S22–S26 and when the shift of the carriage is completed, the content of the shift distance setting buffer 3a is cleared in step S27. Then, the data of print buffer 2 is processed while adding 1 sequentially to the print point 3c in the same way, and when a value of the write point 3b becomes equal to a value of the print point 3c, the printer stops its operation. When the print buffer 2 becomes full, a value of the write point 3b returns to 1 for the next data keyed in. Thus, the data is written into the first print buffer 2a and a value of the print point 3c is also returned again to 1 after it reaches the final digit of the print buffer 2.

Figure 2A:
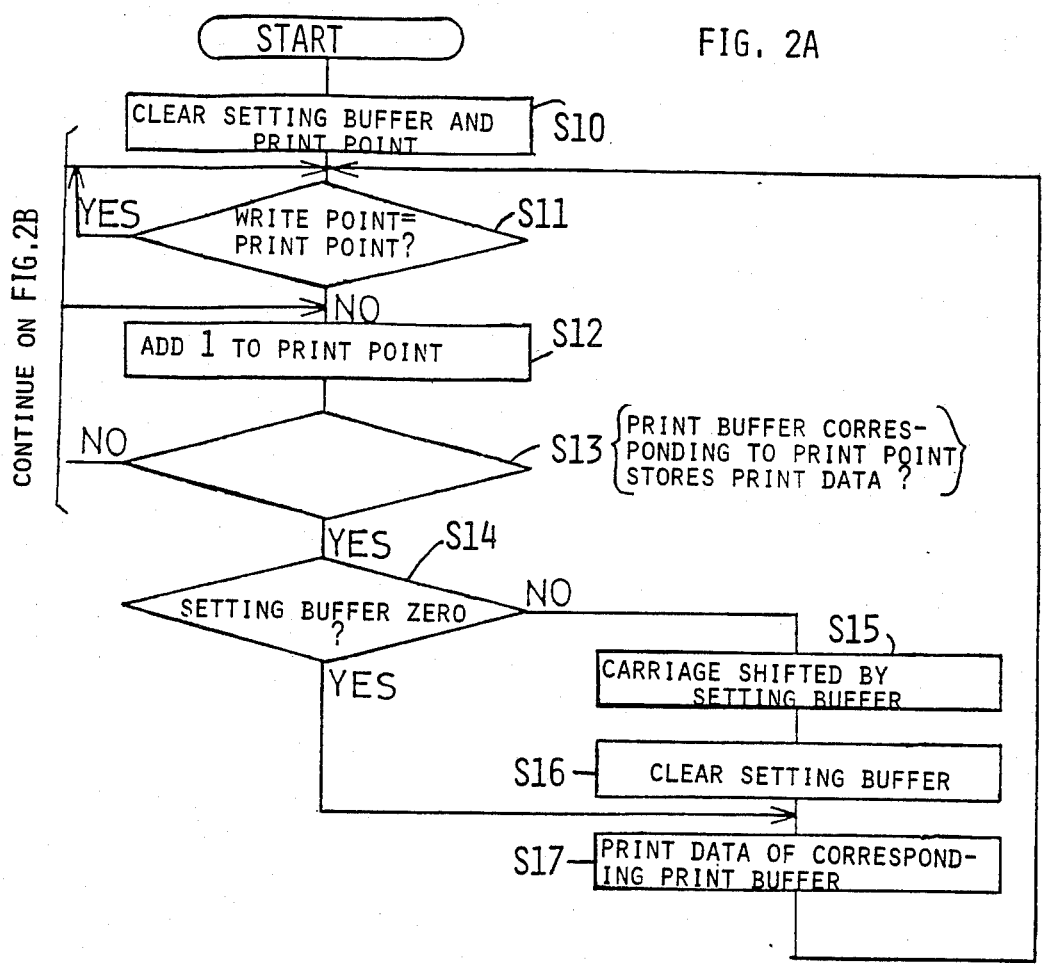

An exemplary routine is depicted in FIGS. 2A and 2B which are to be taken together as one flow diagram. After clearing of the setting buffer and print point in step S10, step S11 is executed wherein the write point and print point are compared. If they are determined to be equal (answer YES), step S11 is repeated.

If they are determined to be not equal (answer NO), then step S12 is executed, namely, the CPU 6 (note herein the CPU controls and executes the routine) adds 1 to the print point. Then, a determination is made in step S13, whether print buffer stores the print data.

If the answer in step S13 is YES, step S14 is executed wherein it is determined whether the setting buffer contains zero.

If the answer in step S14 is NO, steps S15, S16, S17 are executed and then returned to Step S11. That is, the carriage is shifted by the setting buffer (S15). Then, the setting buffer is cleared (S16). Then, the data corresponding to the print buffer is printed (S17).

If the answer in step S14 is YES, step S17 is executed directly and then returned to step S11.

If the answer in step S13 is NO, steps S18 and S19 are executed, namely, the shift distance is calculated (S18) and then, the calculated result is inputted to the setting buffer (S19). Then, step S20 is executed, wherein determination is made whether the write point and the print point are equal.

If the answer in step S20 is NO, step S11 is repeated.

If the answer in step S20 is YES, step S21 is executed wherein t he carriage is shifted, based on the setting buffer. Next, in step S22, it is determined whether shift of the carriage has been completed.

If the answer in step S22 is YES, step S27 is completed with the contents of the setting buffer being cleared, and step S11 is repeated.

When the determination in step S22 is NO, then in step S23 determination is made whether the write point and print point are equal.

If the answer in step S23 is YES, the step S21 is repeated.

If the answer in step S23 is NO, step S24 is executed, wherein determination is made whether the next print buffer is print data.

If the answer in step S24 is YES, step S21 is repeated.

If the answer in step S24 is NO, steps S25 and S26 are executed, namely, 1 is added to the print data(S25) and then, the shift distance is calculated on the latest data and then the results thereof are inputted to setting buffer (S26). Then, step S21 is repeated.

Actual operation of the carriage is now explained with reference to an example. When a tab key is depressed after a carriage return key is depressed, such operation starts during shifting of the carriage, without executing any printing to the left margin position. The operation mode is changed from shifting to the tab set position before the carriage reaches the left margin position and thereby the carriage stops at the preset tab position. Moreover, when a space key is depressed twice before the completion of the shift of the carriage caused by the depression of the tab key, the carriage stops at the position shifted by two spaces from the preset tab position. At this time, shifts of the carriage caused by the tab key and the first and second space key operations are considered as a series of operations and are continuously executed without any interruption.

As described, the electronic typewriter of this invention is capable of avoiding undesired shift of the carriage, increasing speed for starting shifting and decreasing speed for completing shifting. Thus, advantageously, this invention reduces time required for printing operation and also reduces power consumption.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A print head shifting apparatus for a typewriter a printer, or the like, said apparatus driving a carriage with a print head movably supported thereon along a printing line of paper, and executing operations for print character data, print head shift data and paper feed data obtained from an input means; said apparatus comprising a print buffer for temporarily storing print data designating characters entered from said input means, and for temporarily storing a plurality of successive head shift data designating shifting of said print head and entered sequentially from said input means, a succeeding head shift data being entered before stopping of the head at a position designated by a prior head shift data;

a reading means for sequentially and continuously reading the print data and the shift data stored in said print buffer, comprising a print point indicating means for designating a digit position under processing of said print buffer, and a write point indicating means for designating a digit position of final one of said successive head shift data stored in said print buffer;

a calculating means responsive to successive head shift data read by said reading means for sequentially calculating distance data to shift said print head along said print line corresponding to said successive head shift data;

a setting buffer for storing the distance data calculated by said calculating means;

a judging means for judging whether said digit position designated by said print point indicating means to be equal or not to said digit position designated by said write point indicating means; and a control means for shifting said print head to a position designated by the latest one of said successive calculated distance data stored in the setting buffer without stopping said print head at a prior calculated position when said reading means reads said print data stored in said print buffer and said judging means judges said digit position designated by said print point indicating means to be equal to said digit position designated by said write point indicating means.

2. The apparatus of claim 1, wherein further comprising means for advancing the state of said print point indicating means when the present state of said print pointing indicating means does not coincide with the state of said write point indicating means.

3. The apparatus of claim 1 wherein said input means is a keyboard.

4. The apparatus of claim 1 wherein said input means is an interface means for receiving said print data and said head shift data.

* * * * *